United States Patent Office 3,068,174
Patented Dec. 11, 1962

3,068,174
PROCESS FOR PREPARING COMPLEX CALCIUM SALT-CALCIUM SOAP GREASE
Walter S. Pelton, Poughkeepsie, and Norman R. Odell, Fishkill, N.Y., assignors to Texaco Inc., New York, N.Y., a corporation of Delaware
No Drawing. Filed Aug. 24, 1959, Ser. No. 835,444
7 Claims. (Cl. 252—39)

This invention relates to an improved method for preparing complex calcium salt-calcium soap thickened greases containing high proportions of calcium salt.

It has been found heretofore that calcium base greases of improved load bearing and other properties are obtained by employing as the thickening agent a complex of a calcium soap with a calcium salt of a low molecular weight fatty acid, which is formed by heating together a mixture of calcium soap and calcium salt in a mol ratio of 1:7 to 1:40, respectively, at a temperature within a high temperature transition range above about 400° F. In order to obtain satisfactory greases by this method, it is necessary to form the mixture of calcium soap and calcium salt by coneutralizing a high molecular weight fatty acid material and a low molecular weight fatty acid or an acid salt, as disclosed in U.S. 2,735,815.

This invention involves the discovery that very superior greases thickened with calcium salt-calcium soap complexes are obtained in a convenient and advantageous manner by employing a preformed calcium salt of a low molecular weight fatty acid in a high proportion in the grease mixture and heating the grease mixture at an elevated temperature sufficient to produce a thickening effect but below the high temperature transition range. The calcium salt is employed in an amount equal to at least about 15 percent by weight of the finished grease and in a mol ratio of at least about 6:1 with the calcium soap. Greases are obtained in this manner having very much improved extreme pressure properties as compared with calcium soap greases of the prior art containing calcium salts, including such greases containing calcium salts in high proportions obtained by a high temperature heating step. In addition, this method offers very substantial advantages in convenience and economy over the prior art methods, since the use of volatile low molecular weight fatty acids in the grease plant is avoided and the special equipment required for high temperature heating is also obviated. The special object which is attained by our invention is the production of greases having the extreme pressure and other properties required to meet U.S. Steel specification No. 355, for an extreme pressure steel mill grease in a convenient and reproducible manner. The heat treating step within the low temperature range and the amount and proportion of calcium salt employed are critical for obtaining this result by the method of our invention.

The manner in which the calcium soap and calcium salt are associated in these greases is not exactly known. A large amount of thickening occurs during the heat treating step which is greatly in excess of the separate thickening effects of the calcium soap and calcium salt, indicating that a complex of some type is formed. Also, the greases thus produced are highly water resistant, which would be very unexpected in a grease containing a large amount of uncombined water soluble calcium salts. However, the typical X-ray diffraction patterns of the calcium salts do not disappear following the low temperature heat treating step, in contrast to the results obtained with the high temperature heating step as reported in the literature, and it therefore appears that a portion of the calcium salt may be uncombined or in the form of some purely physical combination with the calcium soap or calcium soap-salt complex.

The preferred procedure in accordance with this invention comprises employing in the grease mixture a small amount of an estolide of a high molecular weight hydroxy fatty acid, as disclosed in copending application Serial No. 700,984, now abandoned, of J. R. Roach and T. B. Jordan, filed December 6, 1957. Suitable materials of this character are obtained by the interesterification of $C_{10}$ to $C_{24}$ hydroxy fatty acids and have average molecular weights in the range from about 500 to about 2500. By employing such estolides in amounts from about 0.1 to about 2.5 percent by weight, based on the weight of the finished grease, a large improvement in the grease yield is obtained, and any deterioration in grease yield resulting from the use of the large amounts of calcium salts in these greases can be thereby overcome to a very substantial extent. The estolide may be added at any stage in the grease making process, either before or after the heating step.

The greases with which this invention is concerned comprise a lubricating oil as the chief component thickened to a grease consistency with a calcium lower fatty acid salt and calcium higher fatty acid soap in a mol ratio between about 6:1 and about 20:1, respectively, and preferably from about 7:1 to about 15:1 respectively. The calcium salt is present in an amount between about 15 percent and about 26 percent of the weight of the grease, and preferably in an amount between about 17 percent and about 24 percent of the weight of the grease. The calcium soap is present in an amount of about 4–10 percent by weight, preferably in an amount of about 4–8 percent by weight of the grease. The grease may be substantially neutral or it may contain either a small amount of free acid or free alkali. It is preferably slightly alkaline with about 0.1–1.5 percent by weight of free alkali, calculated as calcium hydroxide. Greases obtained in accordance with the preferred procedure wherein a small amount of estolide is employed in the grease mixture, also contain about 0.1–2.5 percent by weight of estolide or calcium salt thereof.

The oleaginous liquid forming the major constituent of these greases may be any oils of lubricating characteristics which are suitable for use in lubricating greases generally. Such oils include particularly the conventional mineral lubricating oils having Saybolt Universal viscosities in the range from about 75 seconds at 100° F. to about 225 seconds at 210° F., which may be either naphthenic or paraffinic in type or blends of different oils. The preferred mineral oils are those having Saybolt Universal viscosities in the range from about 300 seconds at 100° F. to about 100 seconds at 210° F., which may be blends of lighter and heavier oils in the lubricating oil viscosity range.

Synthetic lubricating oils, which may be preferred for obtaining greases having special properties required for certain types of lubricating service, include oils prepared by cracking and polymerizing products of the Fischer-Tropsch process and the like, as well as other synthetic oleaginous compounds such as diesters, polyesters, polyethers, etc., having viscosities within the lubricating oil viscosity range. Examples of suitable diesters include the aliphatic dicarboxylic acid diesters, such as di-2-ethylhexyl sebacate, di (secondary amyl) sebacate, di-2-ethylhexyl azelate, di-isooctyladipate, etc. A particularly suitable class of synthetic polyesters are those described in U.S. 2,628,974, obtained by reacting an aliphatic dicarboxylic acid with a glycol and a monofunctional aliphatic alcohol or acid. Examples of polyethers include particularly polyalkylene glycols such as polyethylene glycol and polypropylene glycol. The sulfur analogs of these diesters, polyesters and polyalkylene ethers are also suitable for use in the grease compositions of this invention. Examples of suitable compounds of this type include di-2-ethylhexylthiosebacate, di-n-octylthioadipate, polyethylenethioglycol and the reaction product of adipic acid, thioglycol and 2-ethylhexyl mercaptan.

The calcium soap component of the grease is obtained by the saponification of high molecular weight substantially saturated fatty acids containing 10–22 carbon atoms. By substantially saturated is meant such acids having iodine numbers below about 40, and preferably below about 20. The acids may be either unsubstituted or hydroxy substituted acids. Examples of suitable high molecular weight fatty acid materials which may be employed in the saponification include stearic acid, palmitic acid, myristic acid, lauric acid, 12-hydroxystearic acid, 9-hydroxystearic acid, 9,10-dihydroxystearic acid, 8-hydroxypalmitic acid and the monoesters and glycerides of such acids. The preferred saponifiable materials contain a major proportion of unsubstituted fatty acid materials. Very advantageously, a mixture of acids of the character described containing a major proportion of unsubstituted fatty acids having from 12 to 16 carbon atoms per molecule, or the esters of such acids, is employed.

The calcium salt component of these greases is derived from low molecular weight saturated fatty acids containing 1–3 carbon atoms. The calcium salt can thus be calcium formate, calcium acetate, calcium propionate, or mixtures thereof. In further description of the invention, calcium acetate will be used to illustrate the calcium salt component of these greases, although it will be understood that calcium salts of formic and propionic acids may be substituted therefor.

In accordance with the method of this invention, a grease mixture comprising a calcium salt and calcium soap in the above indicated proportions together with lubricating oil constituting all or a portion of the lubricating oil contained in the finished grease is heated at an elevated temperature of at least about 250° F. but below about 400° F. until at least substantial thickening has occurred. The length of time required varies with the temperature, and may range from a few minutes at the higher temperatures to several hours at lower temperatures within the disclosed range. The heating is preferably carried out at a temperature of at least about 275° F., in order to obviate excessively long heating times, and not in excess of about 375 F. in order to avoid local overheating of the grease mixture to temperatures within the high temperature transition range. It is preferably carried out at a temperature below about 350° F. in order to obtain improved storage characteristics as disclosed in the above cited application Serial No. 700,984. Most advantageously, the heating step is carried out at a temperature in the range from about 290° F. to about 350° F. for a period from about 30 minutes to about 4 hours.

The grease mixture is prepared in any convenient manner employing a preformed calcium salt of a low molecular weight fatty acid as described above, such as by merely mixing together the preformed calcium salt and preformed calcium soap of higher fatty acid in suitable proportions in at least a portion of the lubricating oil contained in the grease. The preferred method comprises forming the calcium soap by saponification of the high molecular weight fatty acid material in at least a portion of the lubricating oil contained in the grease, employing an oil substantially unreactive under the saponification conditions, followed by dehydration in the usual manner. The preformed calcium salt may be added to the saponification mixture either before or after the saponification. It may be added to the saponification mixture in substantially dry form or in the form of a water solution. The latter method is convenient where purification of the calcium salt is necessary, but has the disadvantage of requiring the removal of a larger amount of water in the dehydration step.

Following the heat treating step the grease mixture is cooled by any convenient means and finished in the usual manner, preferably with milling. Additional lubricating oil may be added at any stage of the process.

As an example representing a preferred embodiment of this invention, a grease containing a calcium salt of a low molecular weight fatty acid and a calcium soap in a 7.5:1 mol ratio and a small amount of estolide in a mineral lubricating oil was prepared with in situ saponification and heat treating the grease mixture at a maxium temperature of 310° F. The calcium salt employed was a pure commercial calcium acetate in powder form, comprising about 80 percent of particles in the 200–325 mesh size. The mineral lubricating oil was a blend in a 2:3 ratio by weight respectively of a refined paraffinic distillate oil having a Saybolt Universal viscosity of about 185 at 100° F. and a refined residuum from a mixed base crude having a Saybolt Universal viscosity of about 156 at 210° F. The saponifiable material employed was a commercial coconut oil, having a neutralization number of 8.6, a saponification number of 258, an iodine number of 9.8 and a titer ° C. of 22.8.

The grease preparation was carried out in a 150 pound jacketed steam heated open kettle equipped with a stirrer and a recycle line for recycling the grease mixture from the bottom to the top of the kettle, comprising a 1 inch diameter pipe containing a Globe Rota Piston pump and a ½ inch gate valve. The method in detail was as follows: The kettle was charged with 47.6 pounds of the mineral oil and circulation through the recycle line commenced at a rate of about 10 gallons per minute. During the circulation, 19.4 pounds of calcium acetate were added slowly. When a homogenous slurry was obtained, an additional 23.4 pounds of mineral oil, 2.66 pounds of hydrated lime and 0.5 pound of 12-hydroxystearic acid estolide having an average molecular weight of 1600 were added. Heating of the kettle contents was then begun and when the temperature was about 130° F., 7.86 pounds of the coconut oil were added. The kettle contents were then heated to 300° F. in about 3 hours, and the mixture heated further at 300–310° F. for 3 hours with continued recirculation and with shearing by partially closing the gate valve so as to produce a pressure drop of 70–100 p.s.i. across the valve. The grease mixture was then cooled by passing cooling water through the kettle jacket and with continued circulation and shearing to about 225° F., 0.5 pound of phenyl alphanaphthylamine added, and the grease finally drawn at about 200° F. and finished by milling.

A grease of good texture and appearance was obtained as described above, having very superior lubricating properties including exceptionally high extreme pressure properties. The following table shows the extreme pressure properties of this grease (Grease No. 2), in comparison with those of a grease of the same N.L.G.I. grade prepared by the high temperature method (Grease No. 1).

Table I

| Grease No. | 1 | 2 |
|---|---|---|
| Composition: | | |
| Ca acetate | 10.9 | 19.4 |
| Ca soap | 3.6 | 8.1 |
| Excess Ca(OH)$_2$ | 0.1 | 1.0 |
| Ca soap of estolide | 0.9 | 0.5 |
| Glycerin | 0.5 | 1.0 |
| Phenylalphanaphthylamine | None | 0.5 |
| Lubricating Oil | Remainder | Remainder |
| Preparation: | | |
| Maximum Temperature, ° F | 500 | 310 |
| Tests: | | |
| ASTM Penetration at 77° F.— | | |
| Unworked | 268 | 171 |
| Worked, 60 strokes | 312 | 322 |
| Worked, 10,000 strokes | 268 | 357 |
| Dropping Point, ° F | 500+ | 500+ |
| Timken Test, O.K. load, lbs | 17 | 75 |

As shown by the data, an N.L.G.I. No. 1 grade grease giving an O.K. load in the Timken test of 75 was obtained by the method of this invention. On the other hand a calcium salt-calcium soap thickened grease of the same grade prepared by the high temperature method gave an O.K. load of only 17 in the Timken test, or only about that of an ordinary soap thickened grease.

Other greases containing both higher and lower amounts of calcium salt and calcium soap were also prepared successfully by the low temperature method employing preformed calcium salt, both with and without the estolide, and N.L.G.I. No. 1 grade greases giving O.K. loads of at least 40 in the Timken test were obtained with calcium salt contents down to 15 percent, having calcium salt-calcium soap ratios in the range 7:1–15:1. However, greases of this grade having O.K. Timken tests of 40 were not obtained by the high temperature method with heating above 400° F. employing preformed calcium salt, and greases of satisfactory structure and stability containing more than about 10 percent of preformed calcium salt could not be obtained without the estolide.

In addition to their exceptional extreme pressure properties, the greases prepared in accordance with this invention had the other properties, including oxidation resistance, shear stability and water resistance properties required by U.S. Steel specification No. 355. The following table shows the water resistance properties of the grease of our invention described above in comparison with those of the grease prepared by the high temperature method.

*Table II*

Water Washout Test, D-1264

| | Grease loss, percent |
|---|---|
| Grease No. 1 | 8.8 |
| Grease No. 2 | 1.6 |
| U.S. Steel Specification No. 355 | 5 max. |

Obviously many modifications and variations of the invention as hereinbefore set forth may be made without departing from the spirit and scope thereof and only such limitations should be imposed as are indicated in the appended claims.

We claim:

1. The method of preparing an extreme pressure calcium base grease which comprises saponifying a saponifiable material chosen from the class consisting of substantially saturated unsubstituted and hydroxy substituted $C_{12-18}$ fatty acids, mixtures thereof and their esters, with a basic reacting calcium compound in the presence of at least a portion of the lubricating oil contained in the finished grease containing a neutral calcium salt of a fatty acid containing 1–3 carbon atoms per molecule in an amount sufficient to give 15–26 percent by weight of the said salt in the finished grease and a mol ratio of calcium salt to calcium soap of 7:1 to 20:1, and an estolide of a $C_{10-24}$ hydroxy fatty acid having a molecular weight in the range 500–2500 in an amount sufficient to give about 0.1–2.5 percent of estolide in the finished grease, thereafter heating the grease mixture thus obtained at a higher temperature above 250° F. but below 400° F. until at least substantial thickening has occurred and finally cooling the grease mixture and adding any additional lubricating oil required to obtain a grease of the desired grade.

2. The method according to claim 1 wherein the said mixture is heated at a temperature in about the range 275–375° F.

3. The method according to claim 1 wherein the said mixture is heated at a temperature in about the range 290–350° F.

4. The method according to claim 1 wherein the grease is finished by milling.

5. The method according to claim 1 wherein the grease is subjected to shearing during the cooling by passing it through a shear valve with a pressure drop of about 25–200 p.s.i.

6. The method according to claim 1 wherein the calcium salt is employed in the grease mixture in an amount required to give a calcium salt content of about 17–24 percent by weight in the finished grease.

7. The method according to claim 1 wherein the said lubricating oil is a mineral oil.

References Cited in the file of this patent

UNITED STATES PATENTS

| 2,846,392 | Morway et al. | Aug. 5, 1958 |
| 2,862,884 | Dilworth et al. | Dec. 2, 1958 |
| 2,877,181 | Dilworth et al. | Mar. 10, 1959 |
| 2,973,321 | Morway et al. | Feb. 28, 1961 |

FOREIGN PATENTS

| 785,509 | Great Britain | Oct. 30, 1957 |
| 789,855 | Great Britain | Jan. 29, 1958 |